(12) United States Patent
Teranishi

(10) Patent No.: US 7,861,240 B2
(45) Date of Patent: Dec. 28, 2010

(54) TASK DISTRIBUTION PROGRAM AND TASK DISTRIBUTION DEVICE FOR A PROCESSOR DEVICE HAVING MULTIPROCESSORS

(75) Inventor: Masaomi Teranishi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1322 days.

(21) Appl. No.: 11/376,126

(22) Filed: Mar. 16, 2006

(65) Prior Publication Data

US 2007/0234313 A1 Oct. 4, 2007

(30) Foreign Application Priority Data

Nov. 10, 2005 (JP) ............................. 2005-325521

(51) Int. Cl.
G06F 9/44 (2006.01)
G06F 9/46 (2006.01)
(52) U.S. Cl. ..................... 717/172; 718/104; 718/105
(58) Field of Classification Search ............ 717/172, 717/177
See application file for complete search history.

(56) References Cited

U.S. PATENT DOCUMENTS

2001/0003187 A1 * 6/2001 Aoki et al. .................. 709/102
2004/0181784 A1 * 9/2004 Kuwabara et al. ........... 717/137

FOREIGN PATENT DOCUMENTS

| JP | 2004-094301 | 3/2004 |
|----|-------------|--------|
| JP | 2004-171234 | 6/2004 |
| JP | 2004-334537 | 11/2004 |

* cited by examiner

Primary Examiner—Thomas K Pham
(74) Attorney, Agent, or Firm—Fujitsu Patent Center

(57) ABSTRACT

A task distribution program which converts a source program for a single processor into a program for a multiprocessor device having a plurality of processors causes a computer to construct task distribution unit for, by referencing a definition file, which is stored in memory, and which associates one of the processors of the multiprocessor device with tasks of the source program, converting the source program into a distributed source program in which the plurality of tasks of the source program are distributed among the plurality of processors, and adding, as an argument, to the distributed tasks a processor ID of a task subject to processing by the distributed task. A task distribution device, in which this task distribution program is installed, is also provided.

11 Claims, 9 Drawing Sheets

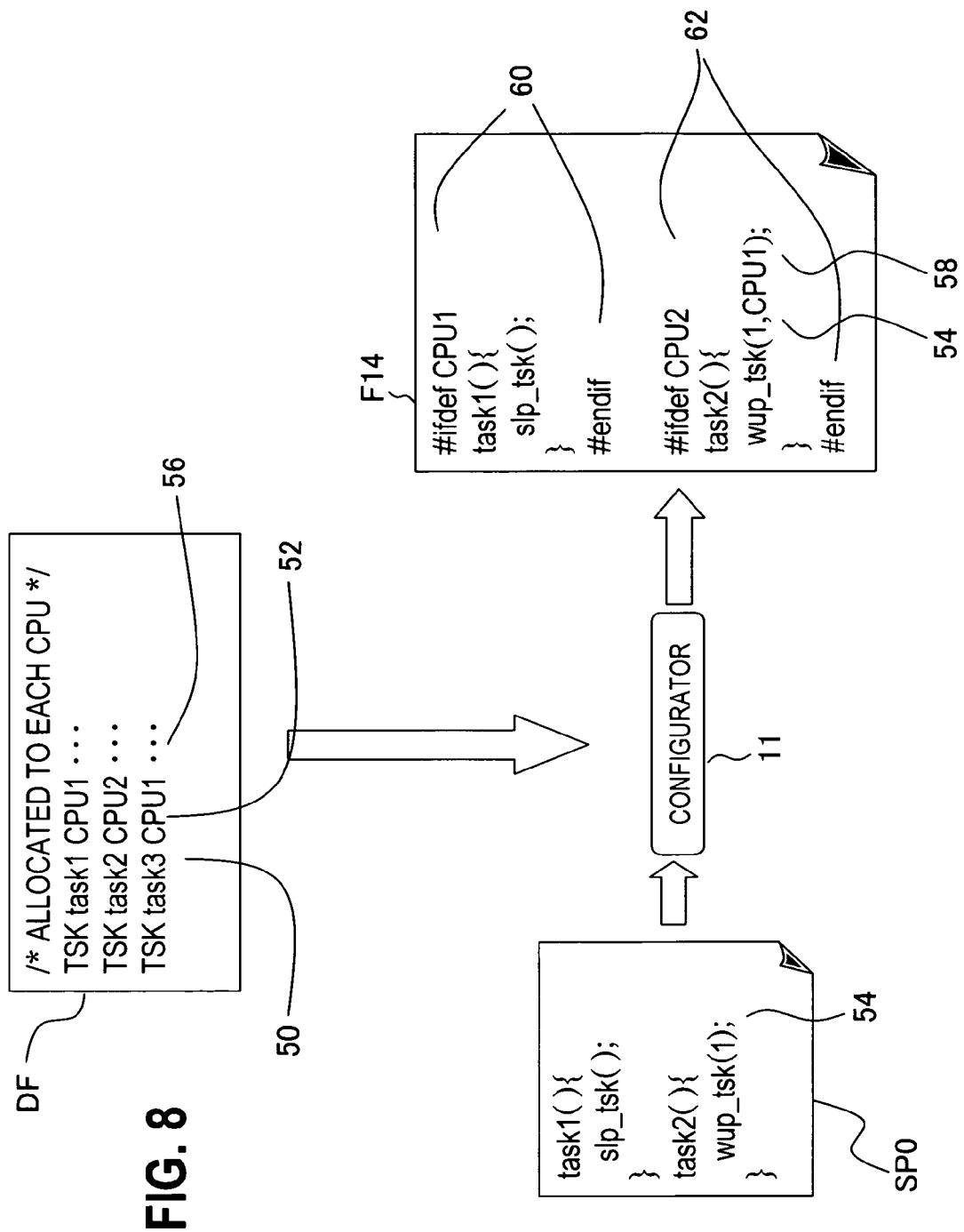

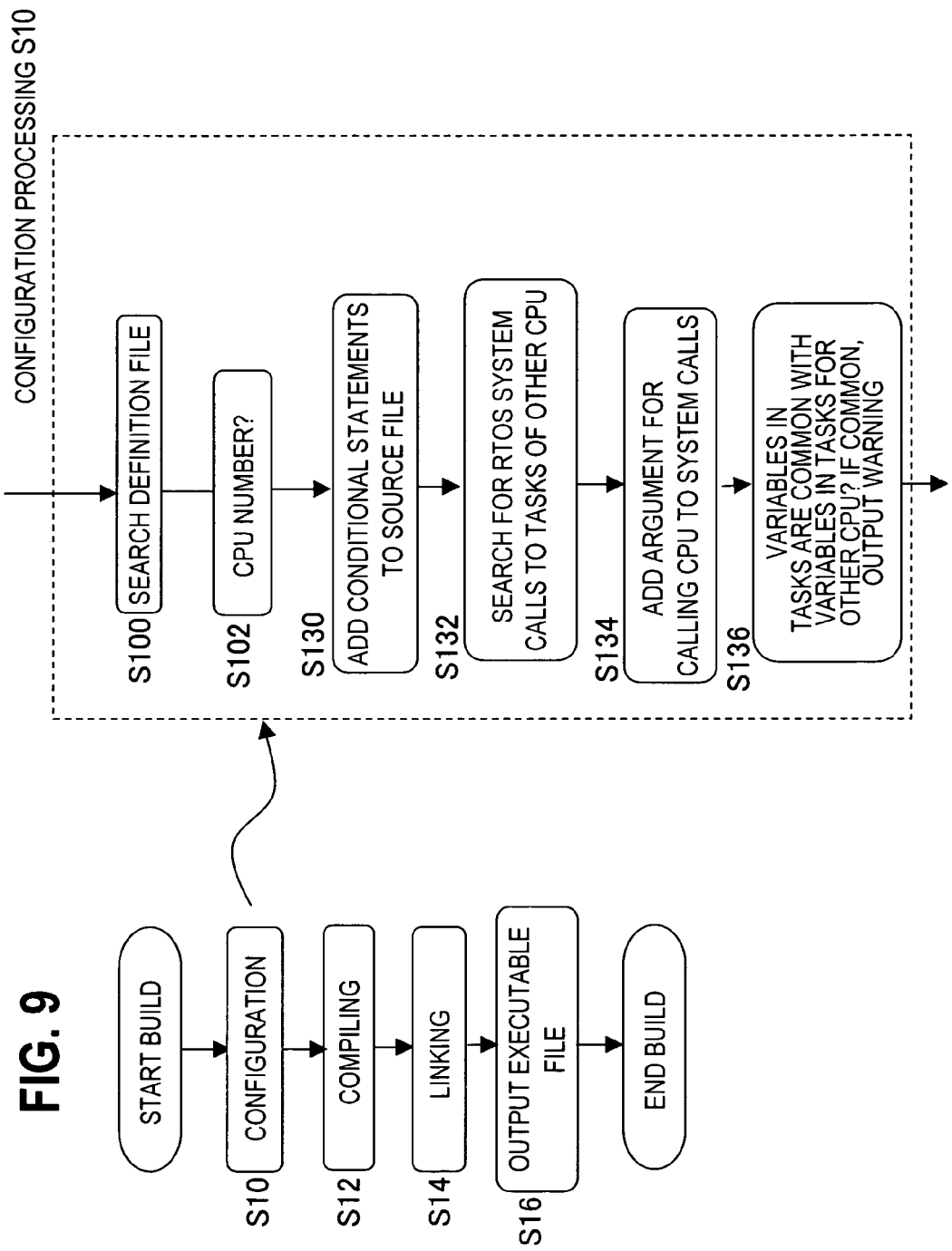

TASK DISTRIBUTION PROGRAM AND TASK DISTRIBUTION DEVICE FOR A PROCESSOR DEVICE HAVING MULTIPROCESSORS

CROSS-REFERENCE TO RELATED APPLICATIONS

This application is based upon and claims the benefit of priority from the prior Japanese Patent Application No. 2005-325521, filed on Nov. 10, 2005, the entire contents of which are incorporated herein by reference.

BACKGROUND OF THE INVENTION

1. Field of the Invention

This invention relates to a task distribution program and task distribution device, for use when porting a source program developed for use with a single processor to a program for a processor device having multiprocessors.

2. Description of the Related Art

Processor devices in recent years have been configured as processor chips or processor chipsets incorporating a plurality of processors. Through the use of multiprocessors, task execution times can be shortened. Hence in recent years, conventional single-processor systems are being replaced with processor devices having multiprocessors, in more powerful processor systems.

Japanese Patent Laid-open No. 2004-171234 discloses a multiprocessor system which executes a single source program by means of a plurality of processors (CPUs). According to this patent, a plurality of processors are linked by means of a bus or other processor linking device, and common memory and input/output control devices are connected to the bus. A task allocation program is installed, and the task allocation program allocates a plurality of tasks of the source program to the individual processors, judges whether program execution efficiency is improved, and performs task allocation so as to improve execution efficiency.

SUMMARY OF THE INVENTION

However, the multiprocessor system of Japanese Patent Laid-open No. 2004-171234 allocates a plurality of tasks in a source program to, for example, a plurality of personal computers, and is not configured to store a program for execution within memory dedicated to each processor, as in the case of processor chips and processor chipsets. In multiprocessor chips and chipsets, each processor has a dedicated memory space, and the program code in the respective memory spaces is executed, therefore a method of allocating the tasks of a common source program to the processors and executing the tasks is not appropriate for such multiprocessor.

Further, in the multiprocessor system of Japanese Patent Laid-open No. 2004-171234, tasks in a common source program are appropriately allocated to a plurality of processors during execution of the source program. If task allocation is performed in parallel in this manner during execution of a source program, the program execution time is lengthened, and such a method cannot be said to be appropriate to processor chips and processor chipsets.

Hence an object of this invention is to provide a task distribution program and task distribution device capable of simply porting a source program developed for use with a single processor to a program for a processor device having multiprocessors.

In order to attain the above object, according to a first object of the invention, a task distribution program which converts a source program for a single processor into a program for a multiprocessor device having a plurality of processors causes a computer to construct task distribution unit for, by referencing a definition file, which is stored in memory, and which associates one of the processors of the multiprocessor device with tasks of the source program, converting the source program into a distributed source program in which the plurality of tasks of the source program are distributed among the plurality of processors, and adding, as an argument, to the distributed tasks a processor ID of a task subject to processing by the distributed task. A task distribution device, in which this task distribution program is installed, is also provided.

By means of the above-described task distribution program and task distribution device of this invention, the plurality of tasks of a source program for a single processor can be converted into a distributed source program distributed to a plurality of processors based on the associations of a definition file, and in addition distribution destination processor IDs for the processor of a task to be processed by the distributed task are added as arguments to distributed tasks, so that porting to a multiprocessor device can be performed simply.

BRIEF DESCRIPTION OF THE DRAWINGS

FIG. 8 is a drawing showing a specific example explaining operation of a configurator in the second embodiment; and, FIG. 9 is a detailed flowchart of configuration processing by a configurator.

DESCRIPTION OF THE PREFERRED EMBODIMENTS

Below, embodiments of the invention are explained using the drawings. However, the technical scope of the invention is not limited to these embodiments, but extends to the inventions described in the scope of claims, and to inventions equivalent thereto.

Figure 1:
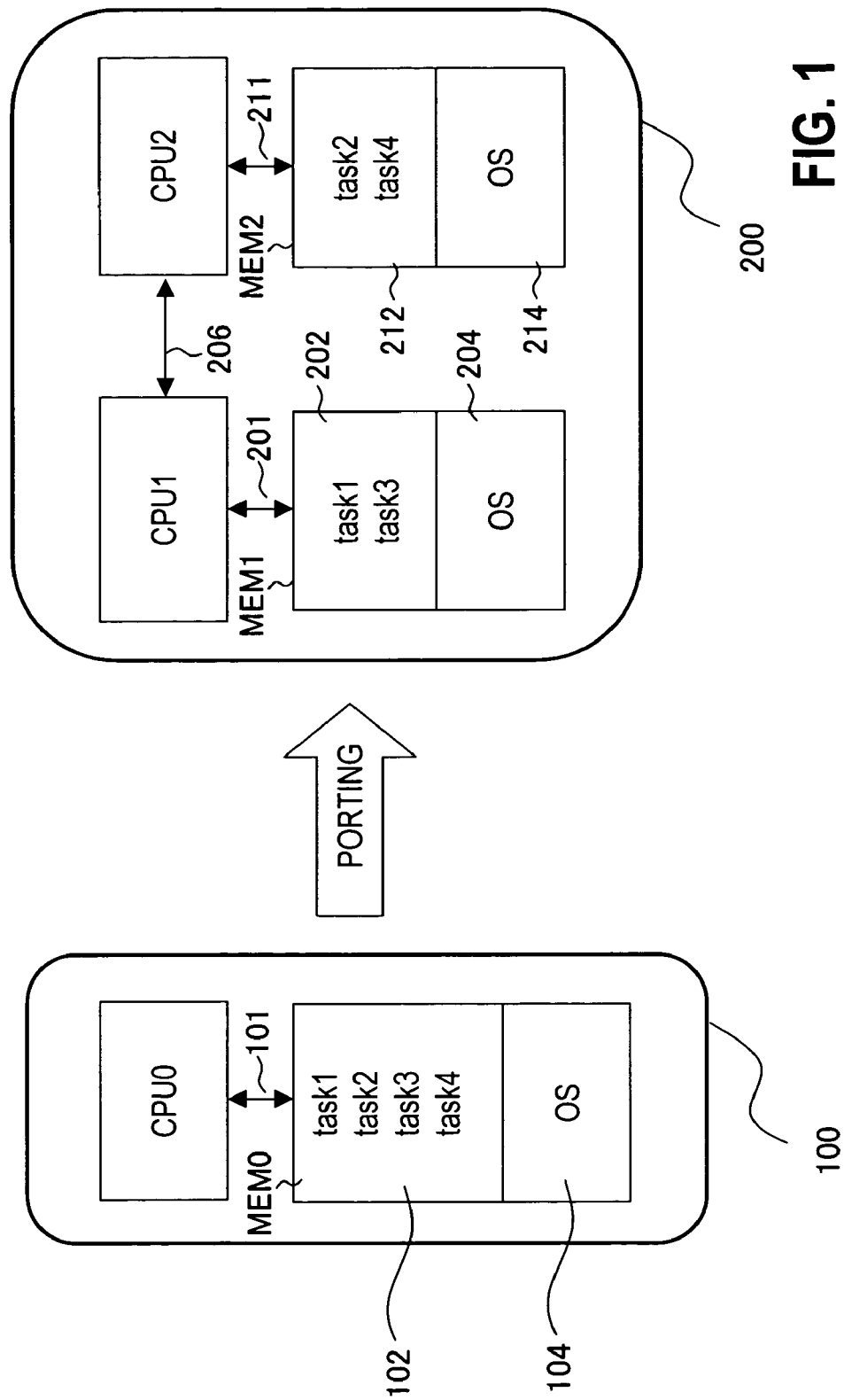
FIG. 1 explains the porting of a program in the case of replacing a single-processor device with a multiprocessor device.

FIG. 1 is a drawing explaining porting of a program when replacing a single-processor device with a multiprocessor device. When replacing a single-processor chip 100, which is a single-processor device, with a multiprocessor chip or chipset 200, which is a multiprocessor device, a program 102 developed for a single processor must be ported or converted into programs 202, 212 for a multiprocessor device. A single-processor device 100 has a single processor CPU0 and memory MEM0 connected via a bus 101; within the memory MEM0 are stored the program 102 and an operating system 104. The program 102 is stored in read-only memory (ROM) in the form of executable object code, which has been converted from source code by a configurator, compiler, linker, and similar.

On the other hand, the multiprocessor device 200 has for example two processors CPU1, CPU2, and dedicated memory MEM1, MEM2 connected via respective buses 201, 211. Within memory MEM1 are stored a program 202 and operating system 204 to be executed by the processor CPU1, and within memory MEM2 are stored a program 212 and operating system 214 to be executed by the processor CPU2. A communication line 206 for interrupt signals and similar is provided between the processors. Hence each of the processors CPU1 and CPU2 has dedicated memory space for the respective dedicated internal memory MEM1 and MEM2, and fetches and executes the programs 202, 212 stored therein.

In the example of FIG. 1, a program 102 for a single processor has four tasks, task1 to task4; tasks task1 and task3 are distributed to the processor CPU1, and tasks task2 and task4 are distributed to the processor CPU2. Using the multiprocessor device 200, the multiprocessors CPU1, CPU2 execute the respective distributed tasks, so that processing faster than for the single-processor device 100 can be performed.

However, the work of porting the resources of a program developed for a single processor to a multiprocessor device is not simple. Normally manpower is utilized to distribute a source program for a single processor to multiprocessors, and the source code of the distributed source program is converted into executable object code by compiling and linking.

Figure 2:
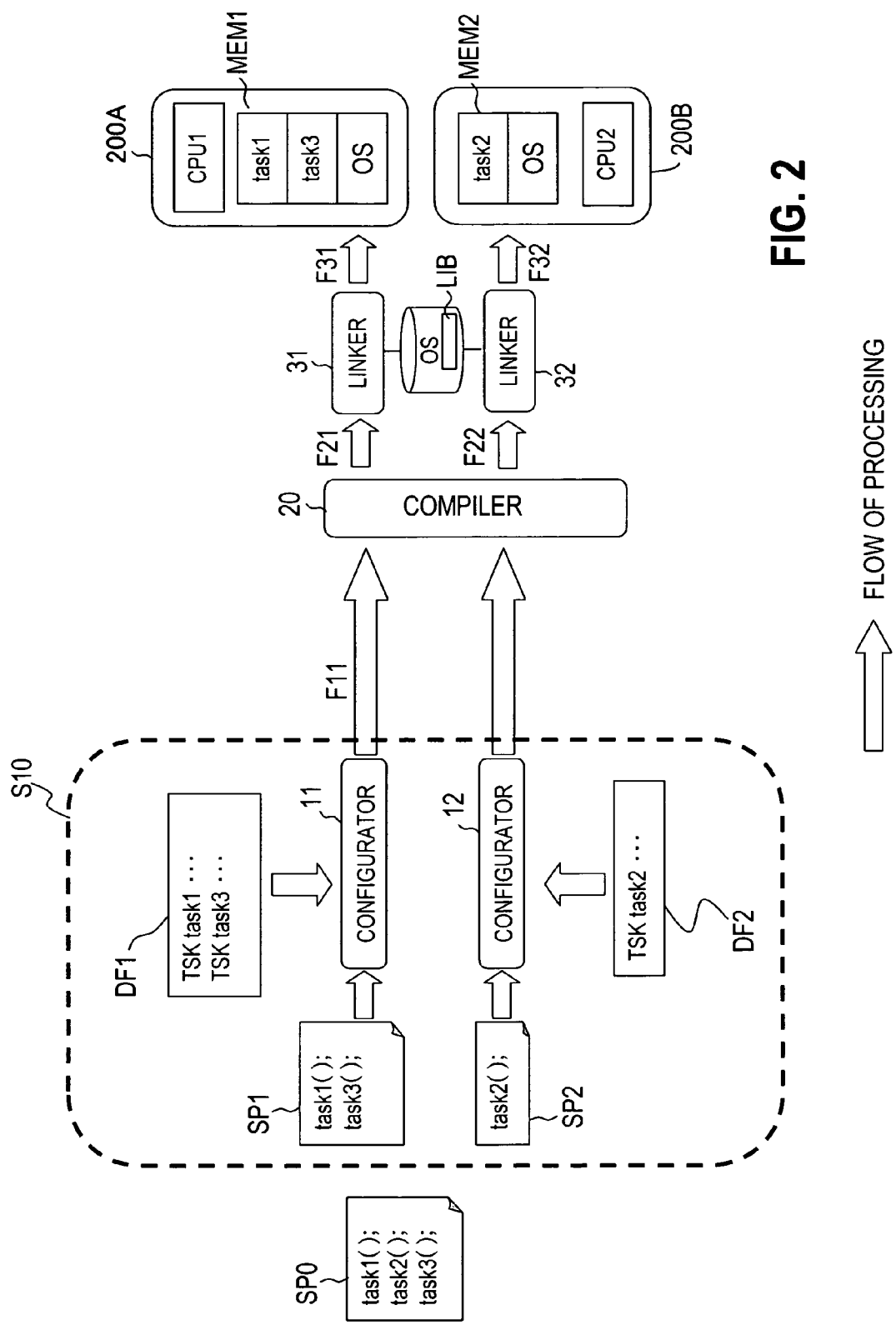
FIG. 2 is a drawing explaining processing to port a generic program.

FIG. 2 is a drawing explaining processing to port a generic program. Porting processing is performed proceeding from the left to the right in the drawing. The process S10 surrounded by the broken line is task distribution processing necessary for porting. The plurality of tasks of the source program SP0 developed for a single processor are distributed among the processor CPU1 and processor CPU2, and the source programs SP1 and SP2 are generated. This distribution is performed by a human. In the distribution work, each task is distributed to the processor thought to be optimal, taking into account the task types, the balance between the loads on the processors CPU1 and CPU2, and similar. When the source code for the distributed source programs SP1, SP2 is provided to the configurators 11, 12, the configurators 11, 12 reference definition files DF1, DF2 having task attributes (operating conditions and similar) for the respective tasks, and generate intermediate files F11, F12. In this process S10, intermediate files F11, F12 for distribution to the respective processors are generated.

These intermediate files F11, F12 have the source code of the source programs SP1 and SP2 and the definition files for the tasks comprised thereby. These intermediate files F11 and F12 are converted into object code F21, F22 by a compiler 20, and library code LIB within the operating system is then linked by linkers 31, 32 to the object code F21, F22, to complete conversion into executable object code F31, F32. Executable object code is thus generated through the above series of builds, and is loaded into the internal memory MEM1 and MEM2 of the processors CPU1, CPU2 in the multiprocessor devices 200A, 200B.

However, the work to distribute a source program SP0 into source programs SP1, SP2 is not necessarily simple; a task which performs processing of tasks executed by different processors requires an argument distinguishing different processors; if the order of tasks having common variables is changed, the processing result may be inappropriate; and there are various other points requiring attention as well. Hence a program tool is sought which is capable of converting the huge quantity of source programs for single processes developed in the past into programs for multiprocessors.

First Embodiment

Figure 3:
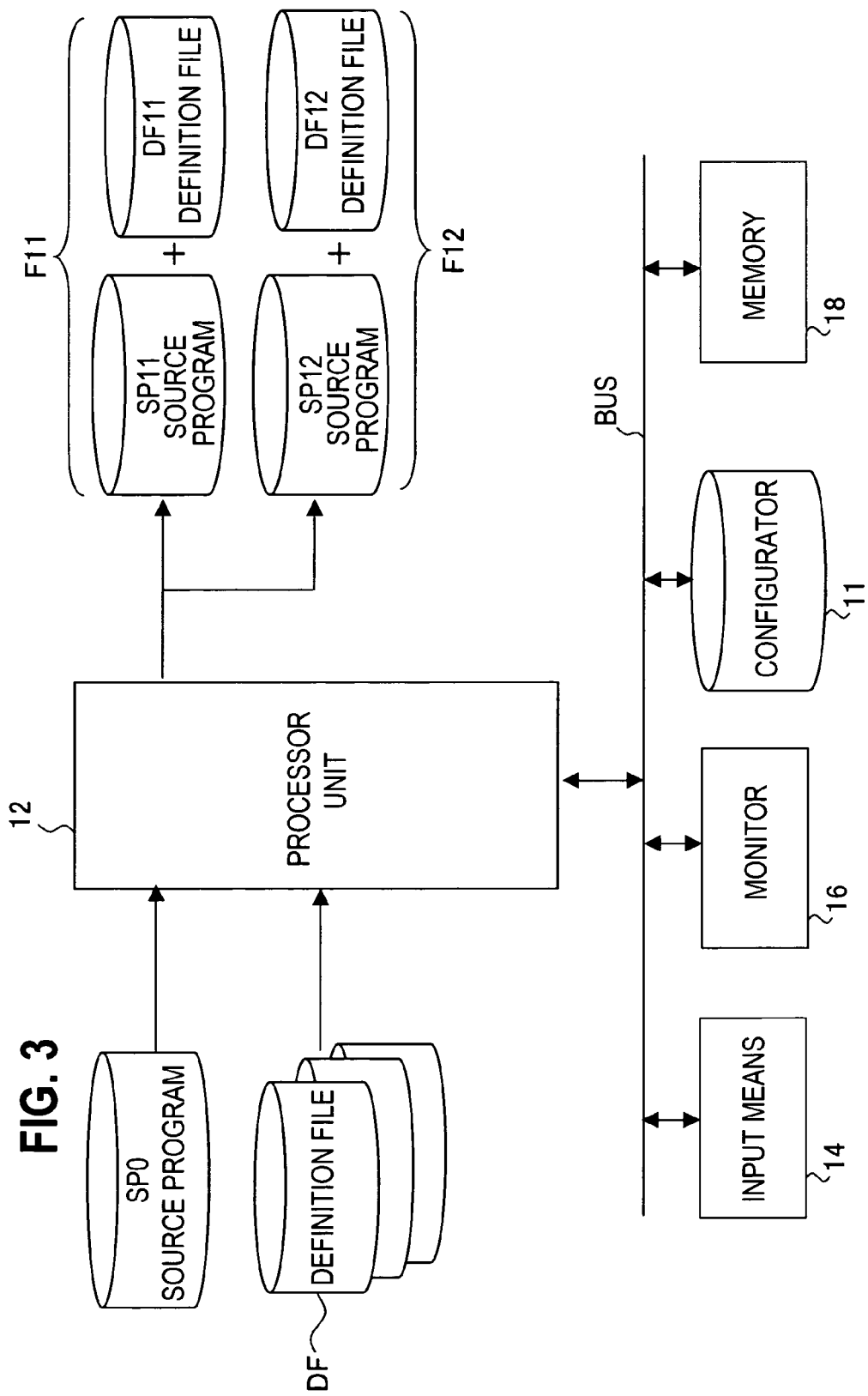
FIG. 3 is a drawing of the configuration of a task distribution device in an embodiment.

FIG. 3 is a drawing of the configuration of a task distribution device in this embodiment. In this task distribution device, a processor unit 12 is connected via a bus BUS to a keyboard, mouse, or other input means 14, monitor 16, internal memory 18, and configurator program file 11. This program file is normally installed in memory. The source code of a source program SP0 developed for a single processor, as well as a definition file DF defining associations indicating which processor in a multiprocessor device is to process each task, are supplied. The processor unit 12 executes the configurator program 11, and converts the plurality of tasks of the source program SP0 into source code of distributed source programs SP11 and SP12 which are distributed to processors. By executing the configurator program 11, the processor unit 12 generates intermediate files F11, F12 in which task definition files DF11, DF12 are added to the respective distributed source code SP11, SP12, similarly to FIG. 2.

In addition to the configurator program 11, compiler and linker program files, as well as the files for an operating system, not shown, are provided in the task distribution device of FIG. 3; by executing these files, the processor may perform compiling and linking processing.

Figure 4:
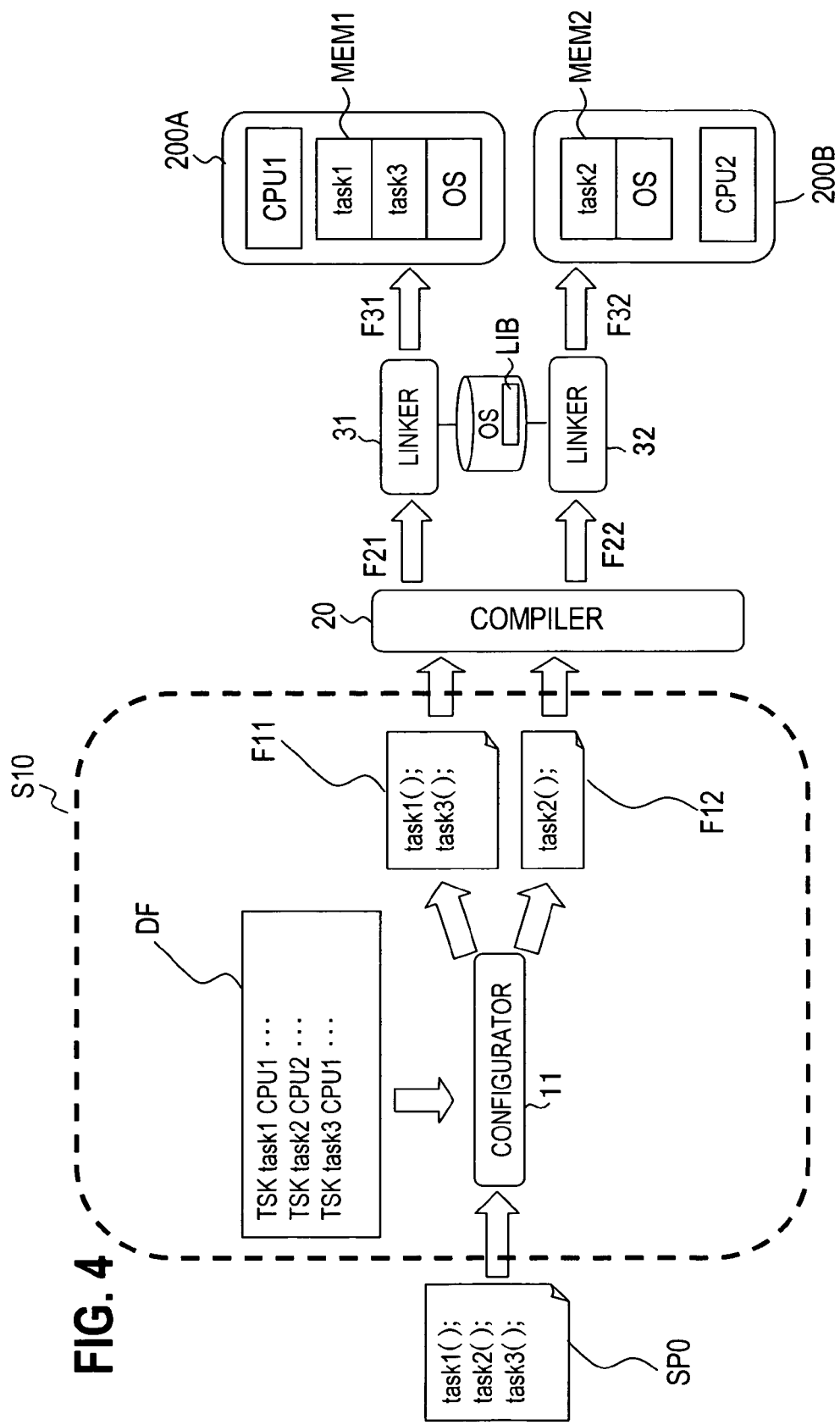
FIG. 4 is a drawing showing the flow of build processing in an embodiment.

FIG. 4 shows the flow of build processing in this embodiment. A build is the creation of an executable program (object code in an executable format) by compiling a source program (source code) in the course of program development, and comprises a series of processing by a configurator, compiler, and linker. In order to convert a source program SP0 developed for a single processor into executable programs F31, F32 for multiprocessors, first, a definition file DF is created for tasks contained in the source program SP0. This definition file DF comprises, in addition to operation conditions and other attribute data for each task shown in FIG. 2, association data indicating which processor is to be made to execute which task.

The configurator 11 distributes the a plurality of tasks of the source code of the source program SP0 for a single processor to the plurality of processors of a multiprocessor device, by referencing the associations between tasks and the executing processors defined in the definition file DF. In the example of FIG. 4, the two tasks task1 and task3 among the three tasks task1 to 3 of the source program SP0 are distributed to processor CPU1, and the one task task2 is distributed to the processor CPU2. At the same time, the configurator 11 adds, as an argument, the processor ID to which a task subject to processing by the distributed task is distributed, as described below. That is, the tasks of the source program SP0 are not simply separated, but required program modifications accompanying division are executed. Further, a warning is output when a plurality of tasks having a common variable are distributed to different processors. This matter is explained below using a specific example.

As explained in FIG. 3, the configurator 11 outputs intermediate files F11 and F12, which add, to the distributed source programs SP11 and SP12, definition files DF11, DF12 for tasks in the source programs.

Then, similarly to an ordinary build, the source code of the intermediate files F11, F12 is converted into object code by the compiler 20, and the object code files F21, F22 are provided to a linker. The linkers 31, 32 link the object code F21, F22 thus provided with library code LIB prepared in advance in an operating system file OS, and generates executable object code F31, F32. This executable object code F31, F32 is installed in the memory MEM1 and MEM2 of the processors CPU1, CPU2 of the multiprocessor devices 200A, 200B.

Figure 5:
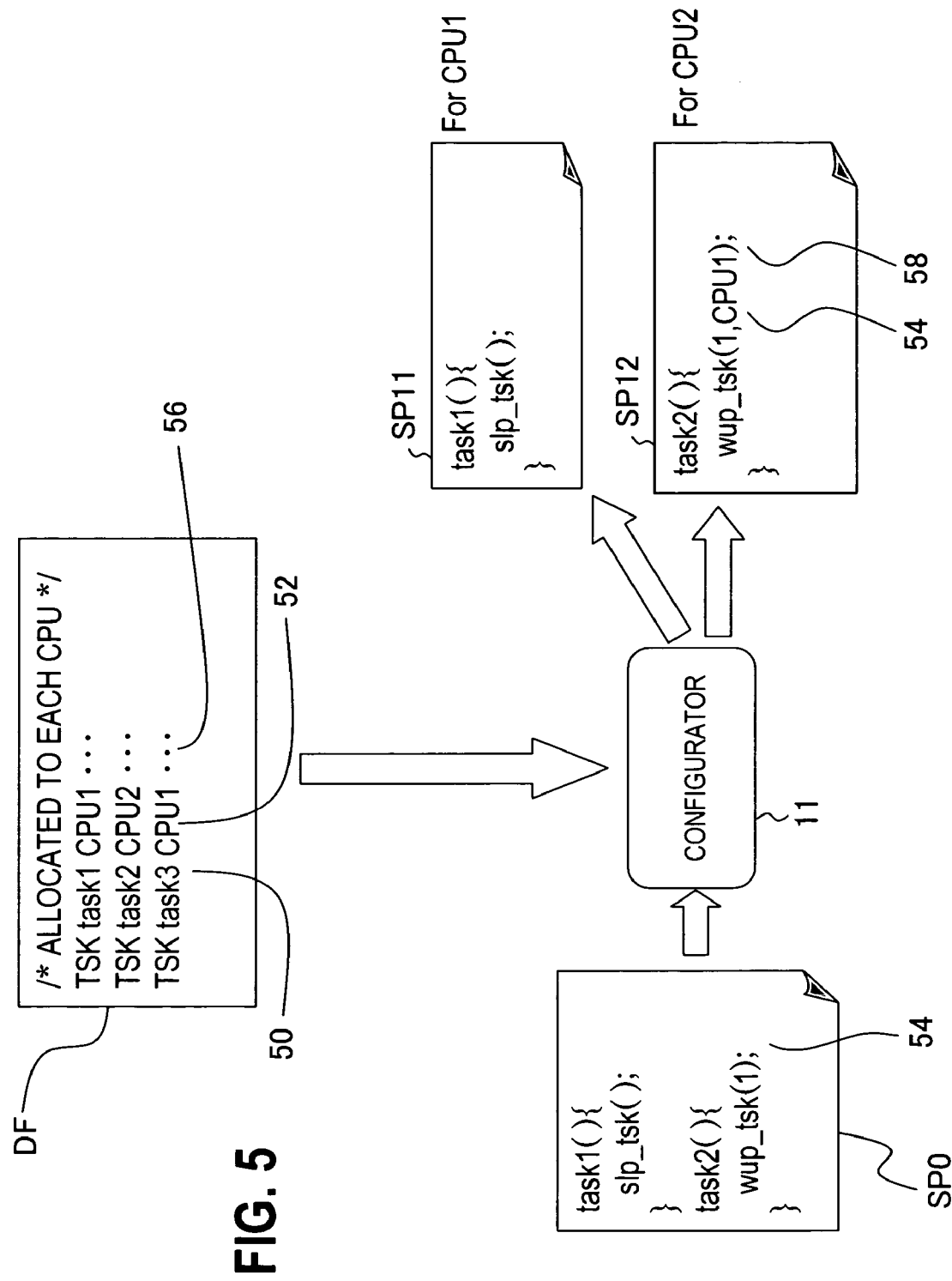
FIG. 5 is a drawing showing a specific example explaining operation of a configurator in an embodiment.
Figure 6:
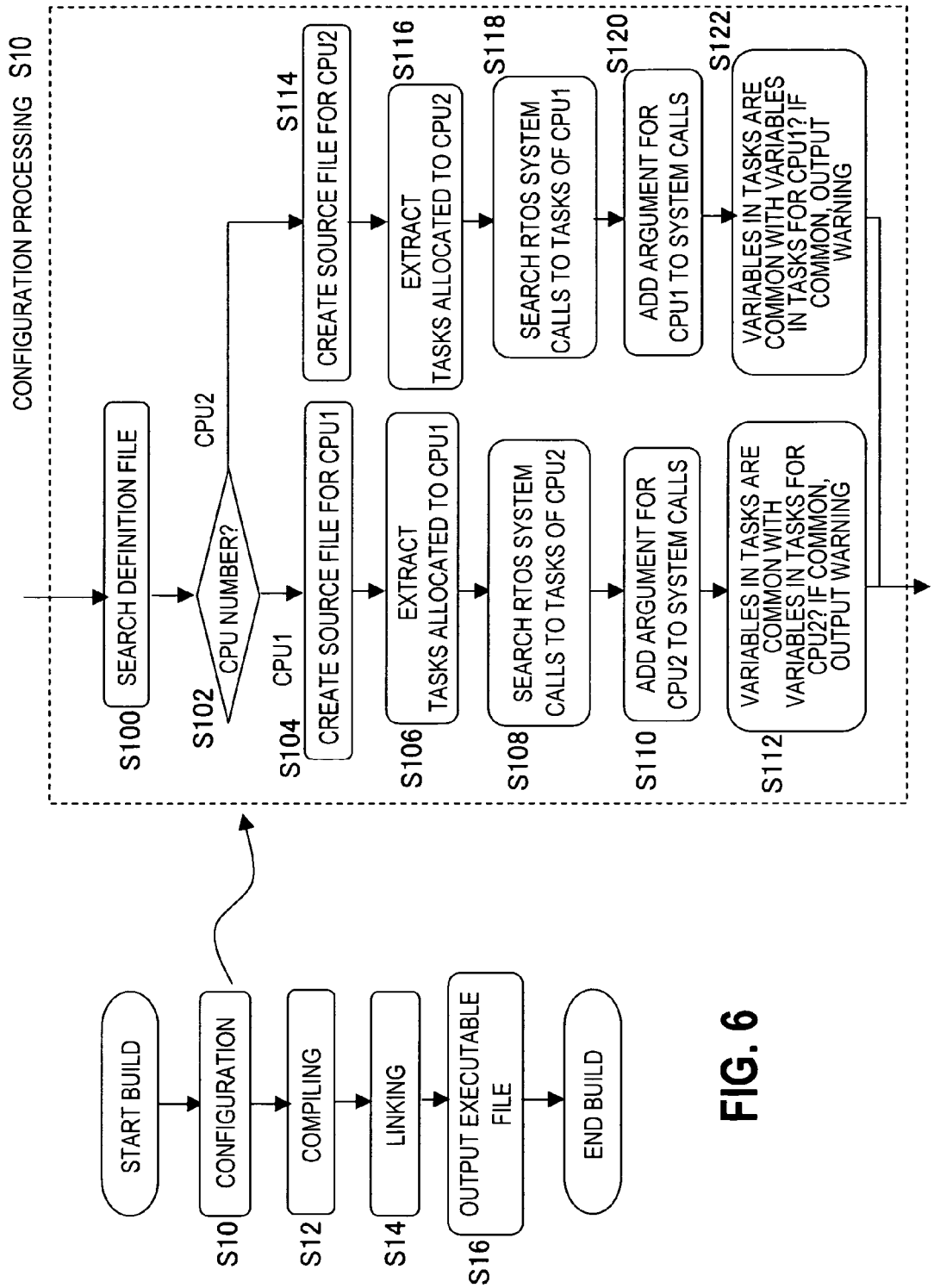
FIG. 6 is a detailed flowchart of configuration processing by a configurator.

FIG. 5 shows a specific example explaining operation of the configurator in this embodiment. FIG. 6 is a detailed flowchart of configuration processing by the configurator. The source program SP0 for a single processor shown in FIG. 5 comprises two tasks, task1 and task2; task1 is a sleep task (slp_tsk( )), and task2 is a wakeup task (wup_tsk(1)) to wake up task1 during sleeping. The language of these source programs is a source program language which operates under an OS conforming to the μITRON specification. The wakeup task wup_tsk(1) has an argument "1" (54 in the drawing) indicating to which sleep task the wake up task is processed. That is, the wakeup task wup_tsk(1) is a system call to task1.

The definition file DF comprises association data 52 indicating which tasks 50 in the source program SP0 are to be processed by which processor, and attribute data 56 for each task. The attribute data 56 comprises conditions and other general attributes for execution of the different tasks.

The configurator 11 distributes each of the tasks in the source code of the supplied source program SPO to a processor based on the processor data 52 associated with tasks 50 in the definition file DF, and generates distributed source programs SP11, SP12. By means of the definition file DF, the task taskl is associated with the processor CPU1, and task2 is associated with the processor CPU2. Hence the configurator 11 distributes the task taskl to the distributed source program SP11 for processor CPU1, and distributes the task task2 to the distributed source program SP12 for processor CUP1.

However, the argument "1" (54 in the drawing) of the wakeup task wup_tsk(1) of task2, distributed to the processor CPU2, indicates task 1; but taskl has been distributed to a different processor CPU1. Hence the configurator 11 adds the ID data "CPU1" (58 in the drawing) 5 for the processor CPU1 to the argument of the wakeup task wup_tsk(1) of task2. As a result, the wakeup task wup tsk(1,CPU1) explicitly indicates that the wakeup task is associated with task1 in the distributed program SP11 distributed to the processor CPU1.

The configurator 11 references the definition file DF in distributing each of the tasks to a processor; however, distribution of a plurality of tasks having a common variable to different processors may result in different processing results for the variable if the order of processing of the plurality of tasks is inverted, and so is undesirable. Hence in task distribution processing, the configurator 11 outputs a warning message when a plurality of tasks having a common variable are distributed to different processors. In order to enable output of a warning message together with the above processing to add an argument, for example, the configurator 11 creates a table indicating the relations with distributed tasks, task IDs for tasks to be processed, and the variables of each task. The configurator 11 then searches this relation table and, to a task which is to perform processing for a task distributed to a different processor, adds as an argument the ID of the different processor, and also checks whether a plurality of tasks having a common variable have been distributed to different processors, and outputs alarm messages.

Configuration processing S10 in a build of this embodiment is explained, referring to the flowchart in FIG. 6. A build has configuration processing S10 which includes task distribution, compile processing S12, and link processing S14. As a result, object code files in executable formats are output to each of the processors of the multiprocessor device (S16).

In the configuration processing S10, the following processing is performed for each task in the source program SP0 for a single processor. First, the configurator 11 searches the definition file DF, references association data 52 for processors associated with tasks, and distributes tasks to each of the processors CPU1 and CPU2 (S102). Then, a source file is created for each processor (S104, S114), and the tasks allocated to the respective processors are extracted from the source program SP0 to the created source files SP11 and SP12 (S106, S116).

As one example, in the case of the source program SP0 of FIG. 5, the sleep task slp_tsk( ) of task1 is associated with processor CPU1 in the definition file DF, and so is allocated to the source file SP11 for the processor CPU1 (S106). And, the wakeup task wup_tsk(1) of task2 is associated with the processor CPU2 in the definition file DF, and so is allocated to the source file SP12 for the processor CPU2 (S116).

After all the tasks of the source program SP0 for a single processor have been allocated to the source files for each processor, a check is performed to determine whether the distributed source program SP11 comprises system calls to a task of the other processor CPU2 (S108). Similarly, a check is performed to determine whether the distributed source program SP12 comprises system calls to a task of the other processor CPU1 (S118). In the example of FIG. 5, the wakeup task wup_tsk(1) of the distributed source program SP12 is a system call to task1 of the processor CPU1, and so an argument for processor CPU1 (58 in FIG. 5) is added to this system call (S120). In the distributed source program SP11 also, if there is a system call to a task of the processor CPU2, then an argument for the processor CPU2 is similarly added. In the example of FIG. 5, no such system call exists, and so no argument is added.

Finally, in each of the source programs SP11 and SP12, a check is performed to determine whether variables in tasks are common to variables of tasks for other processors, and if a common variable is detected, a warning message is output (S112, S122).

By means of the above configuration processing S10, each of the tasks in the source program SP0 for a single processor is distributed to distributed source programs SP11, SP12 for a plurality of processors CPU1 and CPU2, and in addition arguments for different processors are added as necessary, and notification is given when a plurality of tasks having a common variable are separated.

In the above-described definition file DF, tasks and processors are associated based on prescribed rules. Or, tasks and processors may be associated randomly. A plurality of definition files are prepared, task distribution is performed in the above-described configuration processing based on each of the definition files, and executable object code F31, F32, generated from the respective distributed source programs, is installed in the multiprocessor device 200. The multiprocessor device 200 associated with each of the definition files executes the object code actually installed, and evaluates which of the definition files is optimum. Items for evaluation include, for example, power consumption, processing efficiency, and processing speed; and the optimum definition file is determined based on one or a plurality of evaluation items.

Thus by using a configurator of this embodiment, which is a task distribution program, distributed source programs, to which each of the tasks of multiprocessors are distributed from a source program for a single processor, can be automatically generated. Moreover, processor ID arguments, which are necessary when distributing tasks to a plurality of processors, are automatically added. Moreover, warning messages are output providing notification that a plurality of tasks having a common variable have been separated in different processors, so that the possibility of inappropriate processing results can be detected.

Second Embodiment

In a second embodiment, the configurator references a definition file, and adds conditional statements, comprising "if" statements and "end" statements, before and after system calls of each task of a source program for a single processor, according to the processor with which each task of the source program has been associated, to generate a single distributed source program. That is, in the first embodiment, the configurator separated tasks into distributed source programs associated with each processor, so that distributed source program files, separated among a plurality of processors, were generated. In this second embodiment, on the other hand, a single distributed source program file, common to a plurality of processors, is generated. However, conditional statements comprising "if" statements and "end" statements, indicating which of the processors is to execute code, are added to the distributed source program. Hence the compiler separates and outputs converted object code to each processor according to these "if" statements.

Figure 7:
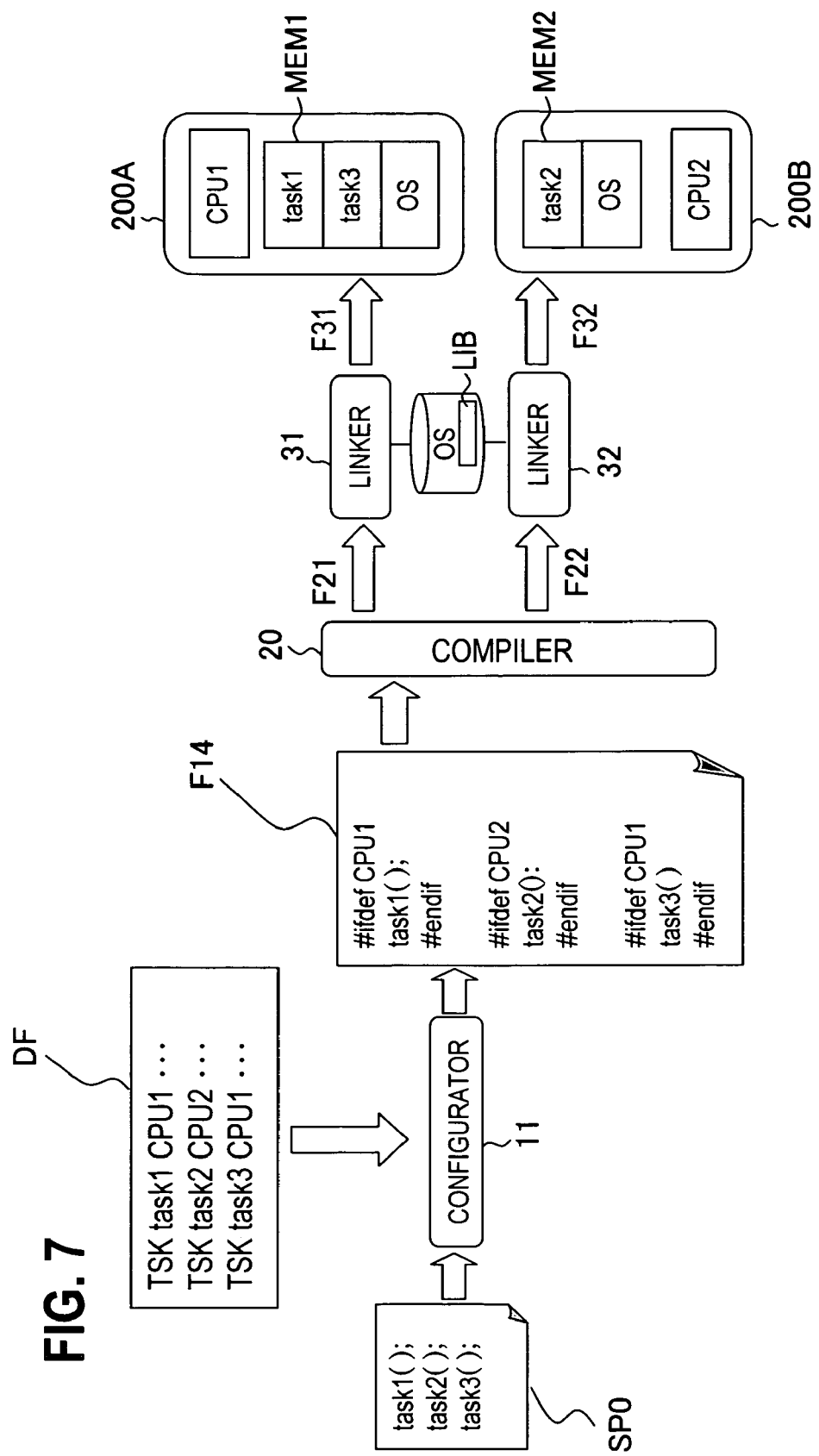
FIG. 7 is a drawing showing the flow of processing in a second embodiment.

FIG. 7 shows the flow of processing in the second embodiment. In contrast with the first aspect in FIG. 4, the configurator 11 generates a single intermediate file F14. The "if" statement "#ifdef" and "end" statement "#endif" are added, in the distributed source program of this intermediate file F14, before and after system calls (task1( ), task2( ), task3( )) of each task in the source program DP0 for a single processor; the definition file DF is referenced to determine the processor to which code is distributed as a condition of an "if" statement. Similarly to FIG. 3, in the intermediate file F14 a definition file is added to the distributed source program.

This intermediate file F14 is supplied to the compiler 20 as in FIG. 4, and object code F21, F22 is generated for each processor. Based on the "if" statement conditions added to the distributed source program F14, the compiler 20 separates and outputs the converted object code F21, F22 to each processor. The linkers 31, 32 then link the library code LIB to the compiled object code F21, F22, and output 15 executable object code F31, F32.

FIG. 8 is a drawing showing a specific example explaining operation of the configurator in the second embodiment. FIG. 9 is a detailed flowchart of configuration processing by a configurator. The source program SP0 for a single processor shown in FIG. 8, like that in FIG. 5, comprises two tasks, task1 and task2, where task1 is a sleep task (slp_tsk( )) and task2 is a wakeup task (wup_tsk(1)). The definition file DF prepared in advance is the same as in FIG. 5, and each task (50 in the drawings) is associated with a processor (52 in the drawings).

The configurator 11 adds pairs of "if" statements and "end" statements 60, 62 before and after each system call in the source program SP0, and outputs the result to an intermediate file F14 comprising a distributed source program file. The processor conditions within the "if" statements are added based on the association data 52 in the definition file DF. Similarly to the first embodiment, the configurator 11 adds, to a task performing processing of a task for a different processor, an argument (58 in the drawings) for the calling processor, i.e. CPU1. Moreover, the configurator 11 checks whether a plurality of tasks comprising a common variable are not distributed to different processors, and if so distributed, outputs a warning message.

Configuration processing S10 in the second embodiment is explained, referring to the flowchart of FIG. 9. The build flowchart is the same as in FIG. 6. In the configuration processing S10, the source program SP0 for a single processor is provided, and configuration processing is performed for the tasks comprised thereby. First the definition file DF is searched (S100), and processors associated with tasks are checked (S102). Then conditional statements 60, 62, consisting of "if" statements and "end" statements, are added before and after system calls (task1( ), task2( ) in FIG. 8) in the source program SP0. That is, the "if" statement "#ifdef CPU1" is added before the system call "task1( )", and the "end" statement "#endif" is added after. And, the "if" statement "#ifdef CPU2" is added before the system call "task2( )", and the "end" statement "#endif" is added after. The processor which is to process the task of the system call is included as a condition in these conditional statements.

After adding the above conditional statements, the configurator 11 performs a search of the generated distributed source program to determine whether there exist system calls to tasks of different processors CPU (S132). When such a system call exists, an argument indicating the calling processor is added to the system call (S134). That is, in the example of FIG. 8, 58 is the new argument "CPU1" for the wakeup task wup_tsk(1) of task task2. This task2 is distributed to processor CPU2, but the task in the sleep state for processing by the wakeup task is task1, which is distributed to the processor CPU1, and so the argument "CPU1" is added, enabling the processor CPU2 to execute the wakeup task for task1, being processed by the processor CPU1.

The configurator 11 checks whether, in the distributed source program, variables in a task are common with variables in tasks distributed to different processors. If such common variables exist, then it is possible that the plurality of tasks having a common variable may be executed in an order different from the desired order, so that inappropriate results are obtained; hence a warning message is output (S136). These processes S132, S134, S136 are the same as processes S108, S110, S112 and S118, S120, S122 in FIG. 6.

Thus in the second embodiment, the configurator 11 distributes the tasks of the source program SP0, but outputs a single distributed source program with conditional statements added for each system call of the tasks. An intermediate file F14 comprising this distributed source program is then converted by a compiler into individual object code files corresponding to processors to which tasks were distributed.

The configurator explained above is a program tool having a task distribution function, which also has a function for addition of arguments for different processors which is necessary when distributing tasks to a plurality of processors, and a function for checking whether tasks having common variables have been distributed to different processors. The configurator differs from a generic configurator in that, in addition to adding conditional files to a source program, the configurator also adds arguments to distributed source programs, and automatically executes necessary processing upon distribution to a plurality of processors of a multiprocessor device. By means of this program tool, a source program for a single processor can be simply converted into executable object code for a multiprocessor device, so that the efficiency of work for processor porting can be improved.

What is claimed is:

1. A tangible computer-readable medium including program instructions for performing, when executed by a computer, conversion of a source program for a single processor into a program for a multiprocessor device having a plurality of processors, the method comprising:

referencing a definition file, which is stored in memory, and which associates one of the processors of the multiprocessor device with tasks of the source program;

converting the source program into a distributed source program in which the plurality of tasks of the source program are distributed among the plurality of processors;

adding, as an argument to the distributed tasks, a processor ID of a task subject to processing by the distributed task; and adding, to the source program, a conditional statement which corresponds to "if" statement and "end" statement for each of the plurality of processors, the conditional statement includes each of the plurality of processors as a condition.

2. The tangible computer-readable medium of claim 1, the method further comprising:

outputting a warning when a plurality of tasks having a common variable in the source program are distributed to different processors.

3. The tangible computer-readable medium of claim 1, wherein the distributed source program is shared with the plurality of processors.

4. The tangible computer-readable medium of claim 1, the method further comprising:

converting source code of the distributed source program into object code for the plurality of processors; and linking library code for associated processors to the object code for the plurality of processors for conversion into executable object code, wherein source code of a plurality of tasks in the distributed source program is converted into object code separated for the plurality of processors, based on the conditions of the condition statements.

5. The tangible computer-readable medium of claim 1, the method further comprising:

converting source code of a distributed source program into object code for the plurality of processors; and linking library code for associated processors to the object code for the plurality of processors for conversion into executable object code.

6. The tangible computer-readable medium of claim 5, the method further comprising:

outputting an intermediate file which includes attribute data of tasks in the distributed source program extracted from the definition file and the distributed source program.

7. A task distribution device, which converts a source program for a single processor into a source program for a multiprocessor device having a plurality of processors, comprising:

definition file memory, which stores a definition file associating one of the processors of the multiprocessor device with tasks in the source program; and task distribution unit that:

converts, by referencing the definition file, the source program into a distributed source program in which a plurality of tasks of the source program are distributed to the plurality of processors, adds as an argument to the distributed tasks, a processor ID for tasks subject to processing by the distributed task, and adds, to the source program, a conditional statement which corresponds to "if" statement and "end" statement for each of the plurality of processors, the conditional statement includes each of the plurality of processors as a condition.

8. The task distribution device according to claim 7, wherein the task distribution unit outputs a warning when a plurality of tasks having a common variable in the source program are distributed to different processors.

9. The task distribution device according to claim 7, wherein the task distribution unit, when performing conversion to the distributed source program, generates a plurality of distributed source programs separated for the plurality of processors.

10. The task distribution device according to claim 7, wherein the distributed source program is shared with the plurality of processors.

11. The task distribution device according to claim 7, further comprising:

a compiler unit which converts source code of the distributed source program converted by the task distribution unit into object code for the plurality of processors; and a linker unit which links library code for associated processors to the object code for the plurality of processors for conversion into executable object code, wherein the compiler unit converts the source code of a plurality of tasks in the distributed source program into object code separated for the plurality of processors, based on the conditions of the condition statements.

* * * * *